United States Patent [19]

Nasu et al.

[11] Patent Number: 4,805,047
[45] Date of Patent: Feb. 14, 1989

[54] READ/WRITE MAGNETIC DISK APPARATUS OPERABLE IN PLURAL DENSITY MODES

[75] Inventors: Masahiro Nasu; Kiyoto Abe, both of Furukawa, Japan

[73] Assignee: Alps Electric Co., Ltd., Japan

[21] Appl. No.: 879,272

[22] Filed: Jun. 27, 1986

[30] Foreign Application Priority Data

Jul. 3, 1985 [JP] Japan .................. 60-147477

[51] Int. Cl.$^4$ .................................. G11B 5/09
[52] U.S. Cl. .................................. 360/65; 360/46; 360/67
[58] Field of Search ............ 360/46, 65, 66, 67

[56] References Cited

U.S. PATENT DOCUMENTS

| | | | |
|---|---|---|---|
| 3,465,321 | 9/1969 | Reisfeld | 360/65 |
| 3,930,265 | 12/1975 | Kimura | 360/45 |
| 3,996,614 | 12/1976 | Budejicky | 360/45 |
| 4,274,116 | 6/1981 | Ida | 360/65 |
| 4,288,827 | 9/1981 | Sato | 360/66 |
| 4,353,100 | 10/1982 | Inoue | 360/65 |
| 4,371,901 | 1/1983 | Shah | 360/65 |
| 4,644,419 | 2/1987 | Iinuma et al. | 360/46 |
| 4,656,533 | 4/1987 | Sakai et al. | 360/65 |

Primary Examiner—Raymond F. Cardillo
Assistant Examiner—Surinder Sachar
Attorney, Agent, or Firm—Guy W. Shoup; Paul J. Winters; Brian D. Ogonowsky

[57] ABSTRACT

A magnetic recording and reproducing apparatus wherein mechanical deteriorations and induced noises can be eliminated and detection signals different in recording density can be read by a reading circuit without a misoperation. The apparatus comprises a filter circuit including a switching element for changing over between different impedance elements in order to allow reproduction from a magnetic medium which is recorded in a recording period which is different from recording and reproducing characteristics of said magnetic head. Preferably, the switching element is a field effect transistor.

4 Claims, 4 Drawing Sheets

READ/WRITE MAGNETIC DISK APPARATUS OPERABLE IN PLURAL DENSITY MODES

BACKGROUND OF THE INVENTION

This invention relates to a floppy disk drive unit which can read and write information in different recording periods from and on floppy disks of a magnetic media for which recording periods are different such as for 1 megabyte and 2 megabytes, and more particularly to a circuit therefor which is improved in its reading performance.

A floppy disk drive unit as a general magnetic recording and reproducing apparatus has come into wide use as a means for recording and reproducing information for use with a personal computer, a word processor, and so on. As general information is diversified and increased in density, a magnetic disk (floppy disk) as storing means for information is required to be reduced in size and have an increased capacity for recording information.

Such a requirement is partially met as the technical development of magnetic recording and reproducing apparatus has progressed of late: for example, a magnetic disk of a size of 3.5 inches can store information of 2 megabytes.

However, the recording period of a floppy disk drive unit for recording and reproducing information of such a lage capacity as 2 megabytes is about one half to that of a floppy disk drive unit for such a small capacity as 1 megabyte, and magnetic heads fo such recording periods are different in recording and reproducing frequency characteristics. Accordingly, information recorded in a longer recording period on a magnetic disk cannot be reproduced nor re-recorded on a floppy disk drive unit for a shorter recording period, and hence it must be rewritten once in a fomt of the shorter recording period, resulting in inconvenience.

Accordingly, a floppy disk drive unit is required to allow reading and writing with a single system of a magnetic disk which is recorded in a different recording period.

Now, a conventional floppy disk drive unit will be described with reference to FIG. 4 which illustrates a construction of a circuit for reading and writing information for 2 megabytes.

Referring to Fi. 4, the circuit includes a magnetic head 1, a change-over circuit 2, a preamplifier 3, a reading circuit 5, a writing circuit 8 and a filter circuit 9.

The magnetic head 1 writes andreads magnetic record data on and from a magentic disk. The change-over circuit 2 operates in response to a changing over instruction from a host computer not shown to change over to couple singals read by the magnetic head 1 to the preamplifier 3 or alternatively to couple signals fro the writing circuit 8 to the magnetic head 1.

Signals inputted from the magnetic head 1 to the preamplifier 3 via the change-over circuit 2 are amplified to a desired voltage and outputted to the filter circuit 9.

The filter circuit 9 receives signals from the preamplifier 3 over two signal lines. To one signal line, a capacitor C1, a resistor R1 and an inducer L1 are connected to series while a capacitor C2, a resistor R2 and an inductor L2 are connected in series to the other signal line. A capacitor 7 is connected in parallel with the two signl lines between junctions between the resistor R1 and the inductor L1 and between the resistor R2 and the inductor L2. A capacitor C6 and a resistor R9 are connected in parallel relationship between one ends of the inductors L1 and L2, that is, at junctions between the filter circuit 9 and the reading circuit 5. Thus, DC voltage components and very low freuency components of signals from the preamplifier 3 are cut by the capacitors C1 and C2 while high frequency components are cut by the inductors L1 and L2 and the capacitors C6 and C7 which interconnect corresponding ends of th inductors L1 and L2. General voltage divisionis attained by the resistors R1 and R2 and the resistor R9 to produce a predetermined output level. The filter circuit 9 having such a construction as described above filters only a frequency band necessary for reading the data and outputs it to the reading circuit 5.

The reading circuit 5 differentiates signals from the filer circuit 9 and shapes waveforms of the signals into pulse signals corresponding to digital codes of 0 to 1. The pulse signals are outputted to the host computer (not shown).

The writing circuit 8 converts input data from the host computer into a level of voltage in accordance with recording andreproducing characteristics of a magnetic disk for 2 megabytes and of the magnetic head 1. The input data thus converted is delivered to the magnetic head 1 via the change-over circuit 2. In this instance, the change-over circuit 2 has been changed over, in response to an instruction from the host computer, to connect the magnetic head 1 to the writing circuit 8.

However, a magnetic recording and reproducing apparatus adapted for a short recording period cannot reproduce from a magnetic disk which is recorded in a long recording period.

This problem will now be described with reference to FIGS. 4 and 5.

FIG. 5 is a diagram illustrating operations of several parts when a magentic disk which is recorded for 1 megabytes is reproduced on a different floppy disk drie unit for 2 megabytes.

On a magentic disk, information is recorded in the form of reversals and non-reversals of polarity of magnetization as shown by "N" and "S" in (c) of FIG. 5 which correspond to digitial codes indicated by "1" and "0" in (a) of FIG. 5. The information recorded on the magnetic disk is detected by a magentic head 1 and is outputted in the form of signal as shown in (e) of FIG. 5 to a reading circuit 5 by way of a filter circuit 9. A portion of the signal (e) called a shoulder as indicated by S1 to S5 is caused due to an excessively high resolution of reading characteristics of he magnetic head for 2 megabytes relative to the writing characteristics of the magnetic head for 1 megabyte. The signal (e) is differentiated by the reading circuit 5 into a signal waveform as shown in (f) of FIG. 5. The signal waveform (f) thus differentiated is then converted into a square wave signal as shown in (g) of FIG. 5 by a zero volt comparator or the like of the reading circuit 5 and is then pulse shaped into pulse signals (h) as shown in (h) of FIG. 4 in accordance with variations in level of the square wave signal (g). The pulse signals (h) involve error pulses E1 to E5 corresponding to the shoulders S1 to S5 as described above. If the error pulses E1 to E5 are inputted to the host computer, this will result in inputting of unnecessary additional pulses for a period for 1 megabyte to the host computer. As a result, an output of the host computer will involve error portions as shown by E in (i) of FIG. 5, and the error portions will be outputted as 1 despite that the magnetization polarity as shown in (c) of FIG. 5 is not reversed as in the error pulses E2 and E4, causing an error in operation.

When the frequency characteristics are not in confomity with each other in this manner, conventionally a method of lowering the high frequency band of the filter characteristics is employed. Thus, in an apparatus which is required to be able to reproduce in different recording periods such as 1 megabyte and 2 megabytes with a single apparatus, it seems advisable to change over the filter by means of a switching element to select a frequency band necessary for the required reproduction. Such an apparatus, however, has various problems as desdribed below.

At first, the apparatus necessitates a number of filter circuits corresponding to that of different recording periods which circuits have a filter characteristic conforming to the detection sensitivity ]of the reading circuit. Further, where a switching element for changing over among the filter circuits is constituted by a bipolar transistor, a base current for interrupting between the emitter and collector will flow into a fignal line, resulting in reduction of Q of the filter circuits. This problem can be resolved if a coupling capacitor of a large capacity is used to separate the base current from the signal line, but anyway, a dispersion will be caused to appear in the central value of signal levels due to a difference in base current between a pair of transistors corresponding to a pair of signal lines, and besides an additional resistor for base biasing or some other additional elements are required. Thus, this resolution is not practical.

Meanwhile, where a switching element is constituted from a mechanical relay or the like, such a problem arising from a base current can be eliminated, but this arrangement also presents various problems that it requires an additional space for installation, that it involves mechanical deteriorations, that noises are induced from the switching element, and so on. Accordingly, this arrangement is less practical.

SUMMARY OF THE INVENTION

Accordingly, it is an object of the present invention to provide a magnetic recording and reproducing apparatus which has a circuit of a simplified construction for changing over between filter characteristics and which has good filter characteristics and can effect a stable changing over operation even after use over a long term to reproduce and re-record information of formats different in recording period with good compatibility.

In order to attain the object, according to the present invention, a magnetic recording and reproducing apparatus comprises a magnetic head for recording and reproducing information on and from a magnetic medium, a filter circuit including a switching element for changing over between different impedance elements in order to allow reproduction from a magnetic medium which is recorded in a recording period which is different from recording and reproducing characteristics of the magnetic head, and a reading circuit for outputting information in response to a signal from the filter circuit, whereby the impedance elements are changed over to correctly read a signal of a different recording period.

DETAILED DESCRIPTION OF THE PREFERRED EMBODIMENT

Now, a first embodiment of the present invention will be described in detail with reference to FIGS. 1 and 2 of the accompanying drawings. In these figures, like parts or elements to those described above in connectionw ith the conventional apparatus are designated by like reference symbols, and detailed description of them are omitted herein.

Figure 1:
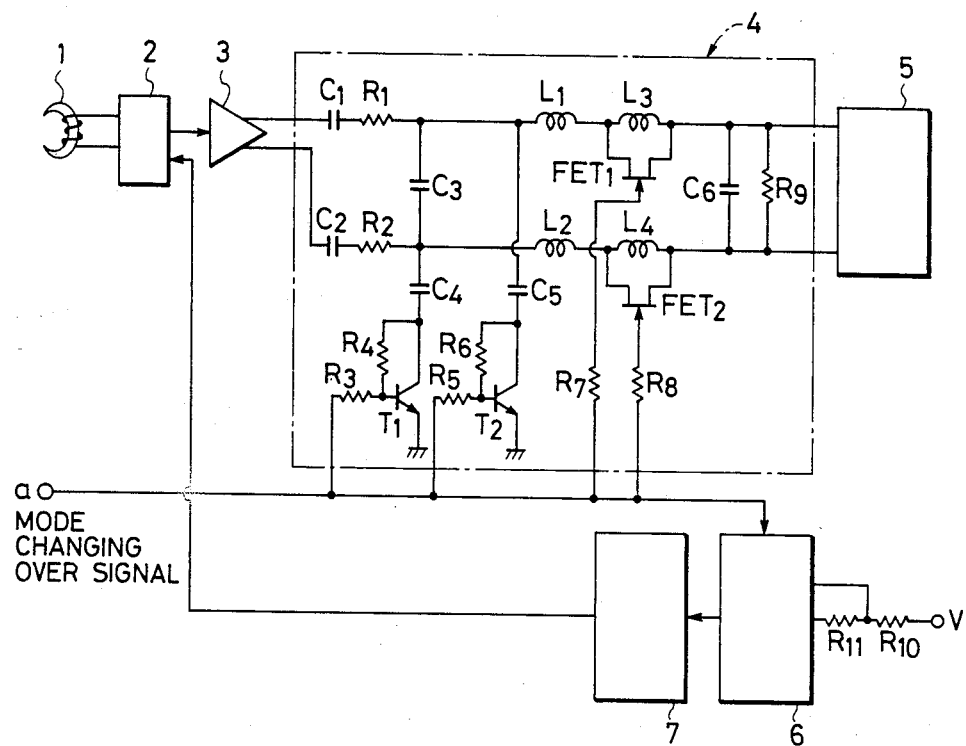
FIG. 1 is a circuit diagram illustrating an electric construction of a magnetic recording and reproducing apparatus according to a preferred embodiment of the present invention.

Referring to FIG. 1, the circuit includes a filter circuit 4, a bias change-over circuit 6, and a writing circuit 7.

At first, construction of the circuit will be described. A magnetic head 1 for recording and reproduction for 2 megabytes is connected to a change-over circuit 2 which is operable to change over to couple a signal read by the magnetic head 1 to a preamplifier 3 or alternatively to couple a recording signal from the writing circuit 7 to the magnetic head 1. Signals from the preamplifier 3 are coupled to the filter circuit 4. The filter circuit 4 includes inductors L3 and L4 connected in series to inductors L1 and L2, respectively, which are in turn connected in series to two signal lines from the preamplifier 3. The sources and drains of field effect transistors FET1 and FET2 are connected in parallel to the inductors L3 and L4, respectively. A mode changing over signal a is applied to the gates of the FET1 and FET2 via resistors R7 and R8, respectively, for a changing over operation as hereinafter described. THe filter circuit 4 further includes a pair of capacitors C4 and C5 connected to opposite ends of another capacitor C3 which is connected inparallel relationship to the input signals thereto. The capacitors C4 and C5 are connected at the opposite ends thereof to the collectors of a pair of transistors T1 and T2. A pair of resistors R3 and R5 for base biasing are connected between the collectors and the bases of the transistors T1 and T2, respectively, and a mode changing over signal a is applied to the bases of the transistors T1 and T2 via the resistors R3 and R5, respectively. The emitters of the transistor T1 and T2 are grounded. Thus, if a conducting condition is established between the collectors and the emitters of the transistors T1 and T2 in response to a mode changing over signal a, the capacitors C4 and C5 will become in parallel with the capacitor C3, resulting in increase in electrostatic capacity.

Meanwhile, the mode changing over signal a is also coupled to the bias change-over circuit 6. The bias change-over 6 is connected to a power source terminal V via a resistor R10 and via the resistor R10 and another resistor R11 so that different voltages may be applied thereto. The bias change-over circuit 6 thus outputs either one of the voltages from the power source terminal V to the writing circuit 7 in response to a mode changing over signal a.

The writing circuit 7 receives input data for recording for 1 megabyte and 2 megabytes from a host computer and outputs writing signals of a level of voltage in accordance with a voltage from the bias change-over circuit 6 to the change-over circuit 2. The change-over circuit 2 thus receives a changing over instruction from the host computer to effect a changing over operation to output the writing signals to the magnetic head 1.

Operation of the apparatus will not be described. When input data are to be delivered to the writing circuit 7 from a host computer, a changing over instruction from the host computer is delivered to the change-over circuit 2 so that it may be changed over to energize the magnetic head 1 with a writing current from the writing circuit 7. When the input data supplied to the writing circuit 7 has a recording period for 1 megabyte and thus correspond to the digital codes as shown in (a) of FIG. 2, the mode changing over signal a delivered from the host computer to the bias change-over circuit 6 presents a low level. In this instance, the bias change-over circuit 6 applies to the writing circuit 7 a voltage which is supplied from the power source terminal V only by way of the resistor R10. The voltage in this instance is selected to have a level which is determined in accordance with a low coercive force characteristic of a magnetic disk for 1 megabyte and also with an excitation intensity with which the magnetic head 1 for 2 megabytes can write in a recording period for 1 megabyte. Thus, the magnetic head 1 is energized as illustrated in (b') of FIG. 2 in response to the input data delivered from the writing circuit 7. The electric current in this instance presents a level as indicated by I2 in (b') of FIG. 2, and this current level I2 is about twice to the level of the electric current when the same magnetic head 1 writes in a recording period for 2 bytes. It is to be mentioned that air gaps of magnetic heads for 2 megabytes and 1 megabyte are different in length and 0.8 μm, 2 μm, respectively, while the ratio in length between the recording periods for 2 megabytes and for 1 megabyte is about 1:2, and the coercive force characteristic of a magnetic disk for 2 megabytes is greater in value than that for 1 megabyte. The magnetic head 1 provides magnetization polarities as shown in (c) of FIG. 2 and thus records on a magnetic disk a magnetic pattern which presents variations with moderate reversing characteristics corresponding to the recording period for 1 megabyte as seen in (d') of FIG. 2. On the contrary, when the input data supplied to the writing circuit 7 has a recording period for 2 megabytes, the mode changing over signal a supplied from the host computer to the bias change-over circuit 6 presents a high level. In this instance, the bias change-over circuit 6 is changed over to apply to the writing circuit 7 a voltae supplied thereto by way of the resistors R10 and R11. The level of the electric current then is about one half to the current level when recording in the recording period for 1 megabyte as described above.

On the other hand, if the changing over instruction supplied from the host computer to the change-over circuit 2 instructs to deliver a signal read by the magnetic head 1 to the preamplifier 3, the reading circuit 5 operates in a recording period in accordance with a mode changing over signal a in response to an instruction from the host computer.

Here, when a detection signal for 1 meabyte is outputted from the magentic head 1, the mode changing over signal is at its low level.

In response to the mode changing over signal a of the low level, the field effect transistors FET1 and FET2 and the transistors T1 and T2 are open-circuited between the sources and drains and between the collectors and emitters, respectively.

As a result, values of inductances connected in series to the two signal liens from the preamplifier 3 become inductances of the inductors L2 and L4 added by those of the inductors L1 and L3, respectively, while the capacitance between the inductors L1 and L2 becomes that of the capaictor 3. The waveform of a signal as indicated by a broken line e'1 in (e') of FIG. 2 from the preamplifier 3 is filtered to remove high frequency components therefrom by the sums of the inductances of the inductors between L1 and L3 and between L2 and L4 and also by the capacitances of the capacitors C3 and C6 connected to opposite ends of the inductors L1 and L3 and of the inductors L2 and L4 so that only those frequency components from which signals for 1 megabyte as indicated by a solid line e'2 in (e') of FIG. 2 can be reproduced are outputt4ed as signals of an output waveform to the reading circuit 5. The sums of the inductances of the inductors L1 and L3 and L2 and L4 and the capacitances of the capacitors C3 and C6 as impedance elements are selected to cut unnecessary high frequency components in accordance with the frequency characteristics when a magnetic disk recorded on a floppy disk drive unit for 1 megabyte is reproduced with a magnetic head 1 for 2 megabytes.

Figure 2:
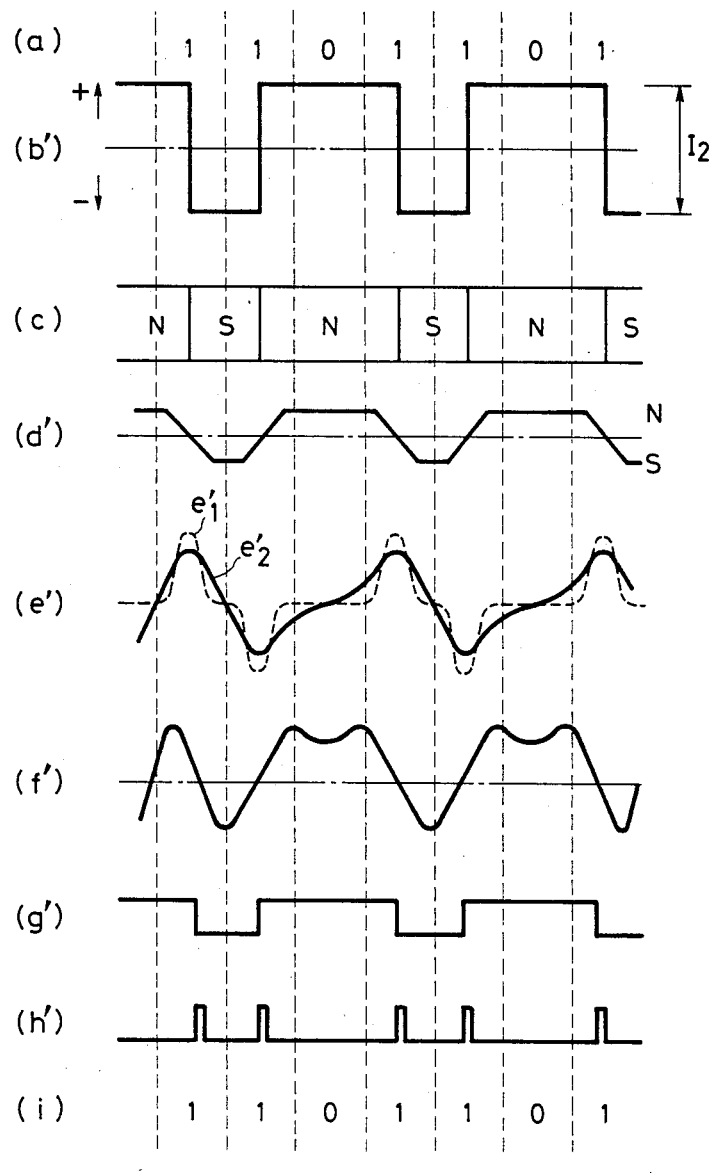
FIG. 2 (a)-(i), is a diagram illustrating operations of the apparatus of FIG. 1.

The waveform (e'2) of the signal outputted from the filter circuit 4 then is differentiated by a differentiator of the reading circuit 5 into a waveform as shwon in (f') of FIG. 2 and is then converted into a square wave signal as shown in (g') of FIG. 2 by a zero volt comparator or the like. The square wave signal (g') is pulse shaped in accordance with variations thereof to produce a pulse waveform as shown in (h') of FIG. 2 which is outputted to the host computer. This pulse waveform (h') is judged properly as a signal for 1 megabyte by the host computer.

Meanwhile, when a signal for 2 megabyte is to be outputted from the magnetic head 1, the mode changing over signal is set to the high level. Thus, in response to the mode changing over signal a of the high level, the field effect transistors FET1 and FET2 and the transistors T1 and T2 are brought into conducting conditions between the sources and drains and between the collectors and emitters, respectively.

Accordingly, the inductances ins eries to the two signal lines from the preamplifier 3 become equal to the inductances of the inductors L1 and L2 due to short-circuiting of the inductors L3 and L4, respectively, while the capacitance between the inductors L1 and L2 becomes equal to the capacitance of the capacitor C3 added to a combined capacity of the capacitors C4 and C5.

The influence of the mode changing over signal a applied then on the signal lines is minimized and arises from a quantity of electricity momentarily stored in the gates of the field effect transistors FET1 and FET2 and also from a difference in base current between the transistors T1 and T2 due to fluctuations of such base currents. By the difference in base current between the transistors T1 and T2, the center of the output waveform is displaced only a little.

Of the signals for 2 megabytes from the preamplifier 3, only frequency components with which signals for 2 megabytes can be reproduced are ouputted to the reading circuit 5 due to the inductances of the inductors L1 and L2, a combined capacitance of the capacitors C3, C4 and C5 connected to opposite ends of the inductors L1 and L2, and the capacitance of the capacitor C6.

The signals for 2 megabytes inputted from the filter circuit 4 are processed in a similar manner to that of the reading operation for 1 megabyte by the reading circuit 5 and is thus judged properly as pulse signals for 2 megabytes by the host computer.

Figure 3:
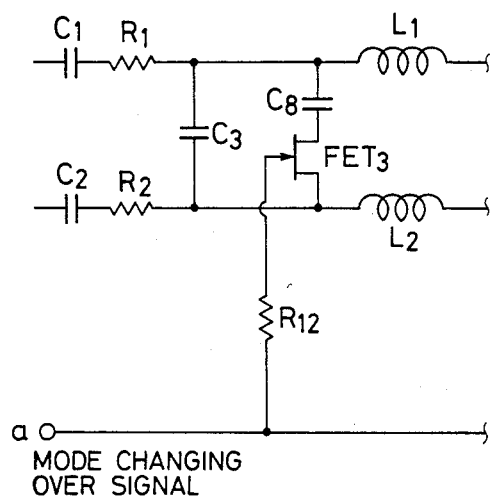
FIG. 3 is a circuit diagram illustrating a circuit according to another preferred embodiment of the invention.
Figure 4:
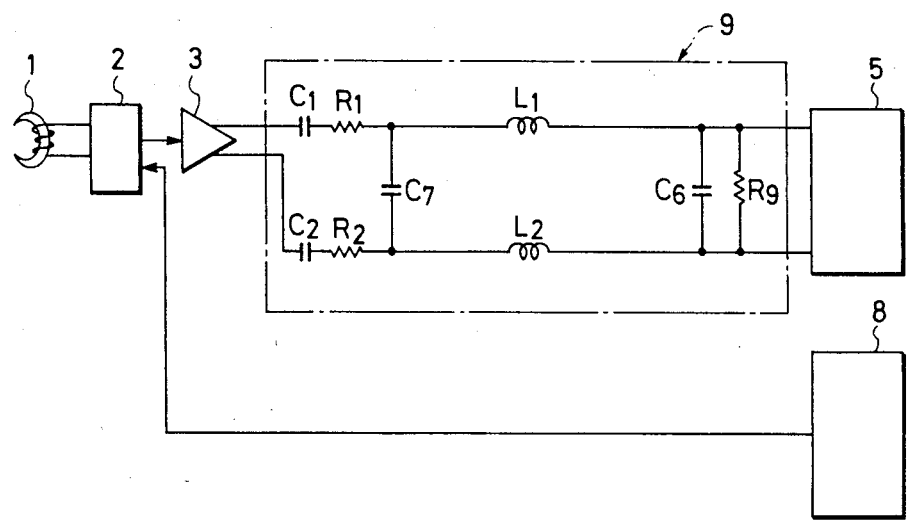
FIG. 4 is a circuit diagram illustrating an electric construction of a typical one of conventional magnetic recording and reproducing apparatus.
Figure 5:
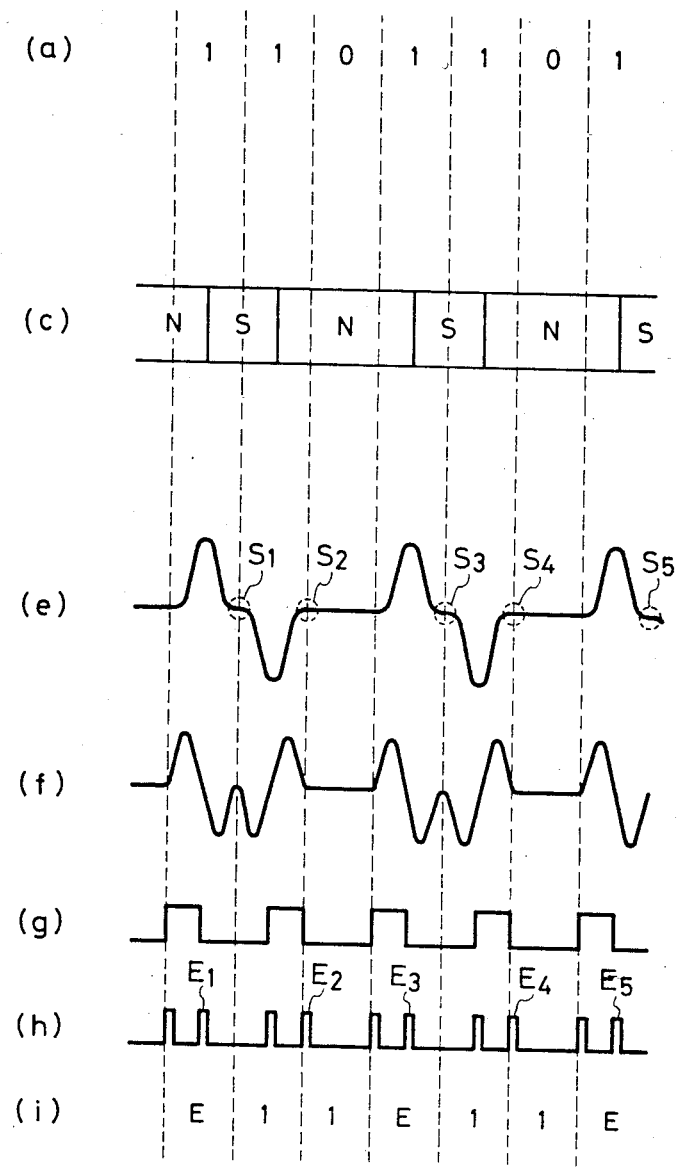
FIG. 5 (a)-(i), is a diagram illustrating operations of the apparatus of FIG. 4.

FIG. 3 is a circuit diagram which illustrates part of a modified form of the filter circuit 4 in the first embodiment described above, and in this figure, like parts or elements to those of the embodiment described above are designated by like reference symbols, and detailed description of them is omitted herein.

Referring to FIG. 3, a capacitor C3 is connected in parallel with signal lines between a pair of junctions between a resistor R1 and inductor L1 and between another resistor R2 and another inductor L2 of the filter circuit 4. Another capacitor C8 is connected to one of the unctions adjacent the inductor L1. The capacitor C8 is connected to the other junction adjacent the inductor L2 by way of the source and crain of a field effect transistor FET3. A mode changing over signal a is supplied by way of a resistor R12 to the gate of the field effect transistor FET3.

In this modification, the transistors T1 and T2, the capacitors C4 and C5 and the resistors R3, R4, R5 and R6 of FIG. 1 are replaced by the field effect transistor FET3, the capacitor C8 and the resistor R12. In the circuit including the thus replaced elements, parts can be reduced in number, and a phenomenon of dispersion of the central value of signal levels caused by dispersion of base currents of the transistors T1 and T2 can be minimized. And even if a situation in which correction is required should occur, correction can be effected simply since the necessity therefor is partial to only one of the signal lines, and hence a stabilized changinv over output can be obtained.

Besides, the construction in which a circuit is provided with parallel signal lines for changing over therebetween can be applied also to a circuit for correcting oput waveforms from an inner track and an outer track of a magnetic disk.

As apparent from the foregoing description, according to the present invention, a filter circuit receiving of a signal read by a magnetic head is changed over by means of a field effect transistor to produce a desired filter characteristic. Accordingly, while a conventional apparatus presents various problems arising from its construction for changing over an impedance element on parallel signal lines by means of a complicated circuit of bipolar transistors or a mechanical element such as a relay and hence is not practical, according to the invention, mechanical deteriorations and induced noises can be eliminated, and the impednace element serial to the signal lines can be changed over with a simplified circuit construction. Besides, an electric current for changing over the element does not flow into the signal lines, assuring stabilized filter characteristics. Accordingly, the invention presents an effect that signals of different recording densities can be read by a reading circuit without a misoperation.

What is claimed is:

1. A read/write circuit for a magnetic recording and reproducing apparatus comprising:

a magnetic head for recording information on a magnetic disk, and for reading information from a magnetic disk which may be recorded thereon in different recording periods;

a filter circuit connected to said magnetic head for receiving input signals read by said magnetic head from a magnetic disk, said circuit having a pair of signal lines receiving the input signals at input ends thereof in parallel from said magnetic head, said signal lines including impedance elements connected in series on each line and between respective junction points across the signal lines, wherein said filter circuit has filter characteristics for filtering input signals of one recording period;

an output read circuit connected to output ends of the two signal lines for outputting data signals filtered in accordance with the filter characteristics of said filter circuit;

mode changing means for changing the filter characteristics of said filter circuit to filter input signals of a different recording period, including means for providing a mode changing signal from an external control device corresponding to selection of input signals of the different recording period, an additional impedance element connected to each of said signal lines of said filter circuit, and a field effect transistor switching element connected to each of said signal lines of said filter circuit, and a field effect transistor switching element connected in parallel with said additional impedance element and controlled by said mode changing signal to selectively switch said additional impedance element into and out of said filter circuit, hence changing the characteristics of said filter circuit, depending upon whether said mode changing signal is applied to its gate, wherein said filter circuit further includes one signal line having a first capacitor and a first inductor in series, the other signal line having a second capacitor and a second inductor in series, and a third capacitor connected between the two signal lines at respective junction points between said first capacitor and first inductor and between said second capacitor and second inductor.

2. A read/write circuit for a magnetic recording and reproducing apparatus according to claim 1, wherein said mode changing means and additional impedance element comprises a third inductor connected across a source and drain of a first field effect transistor switching element, said third inductor being connected in series between said first inductor and the output end of the one signal line, and a fourth inductor connected across a source and drain of a second field effect transistor switching element, said fourth inductor being connected in series between said second inductor and the output end of the other signal line.

3. A read/write circuit for a magnetic recording and reproducing apparatus according to claim 2, wherein said mode changing means and additional impedance element further comprises a fourth capacitor connected in series with said junction point of the one signal line and a collector of a first transistor, and a fifth capacitor connected in series with said junction point of the other signal line and a collector of a second transistor, wherein emitters of both transistors are connected for receiving said mode changing signal.

4. A read/write circuit for a magnetic recording and reproducing apparatus comprising:

a magnetic head for recording information on a magnetic disk, and for reading information from a magnetic disk which may be recorded thereon in different recording periods;

a filter circuit connected to said magnetic head for receiving input signals read by said magnetic head from a magnetic disk, said circuit having a pair of signal lines receiving the input signals at input ends thereof in parallel from said magnetic head, said signal lines including impedance elements connected in series on each line and between respective junction points across the signal lines, wherein said filter circuit has filter characteristics for filtering input signals of one recording period;

an output read circuit connected to output ends of the two signal lines for outputting data signals filtered in accordance with the filter characteristics of said filter circuit, and mode changing means for changing the filter characteristics of said filter circuit to filter input signals of a different recording period, including means for providing a mode changing signal from an external control device corresponding to selection of input signals of the different recording period, and an additional impedance element connected to each of said signal lines of said filter circuit, wherein said filter circuit further includes one signal line having a first capacitor and a first inductor in series, the other signal line having a second capacitor and a second inductor in series, and a third capacitor connected between the two signal lines at respective junction points between said first capacitor and first inductor and between said second capacitor and second inductor, wherein said additional impedance element is another capacitor connected in series with a field effect transistor switching element, controlled by said mode changing signal, said capacitor and said field effect transistor switching element being connected between said junction points of said signal lines in parallel with said third capacitor.

* * * * *

UNITED STATES PATENT AND TRADEMARK OFFICE
CERTIFICATE OF CORRECTION

PATENT NO. : 4,805,047
DATED : February 14, 1989
INVENTOR(S) : Nasu et al.

It is certified that error appears in the above-identified patent and that said Letters Patent is hereby corrected as shown below:

<u>IN THE ABSTRACT</u>

Line 9, between "a" and "recording" insert --different--.

Lines 9-11, delete "which is different from recording and reproducing characteristics of said magnetic head"

Signed and Sealed this

Nineteenth Day of January, 1993

Attest:

DOUGLAS B. COMER

*Attesting Officer*  *Acting Commissioner of Patents and Trademarks*